(No Model.)
O. B. SHALLENBERGER.
ALTERNATING CURRENT ELECTRIC MOTOR.
No. 591,242. Patented Oct. 5, 1897.
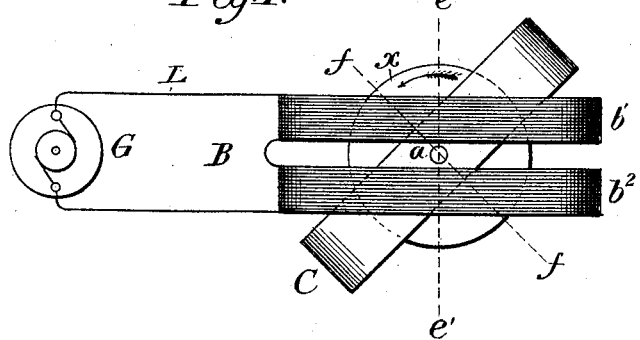
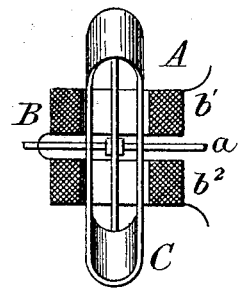
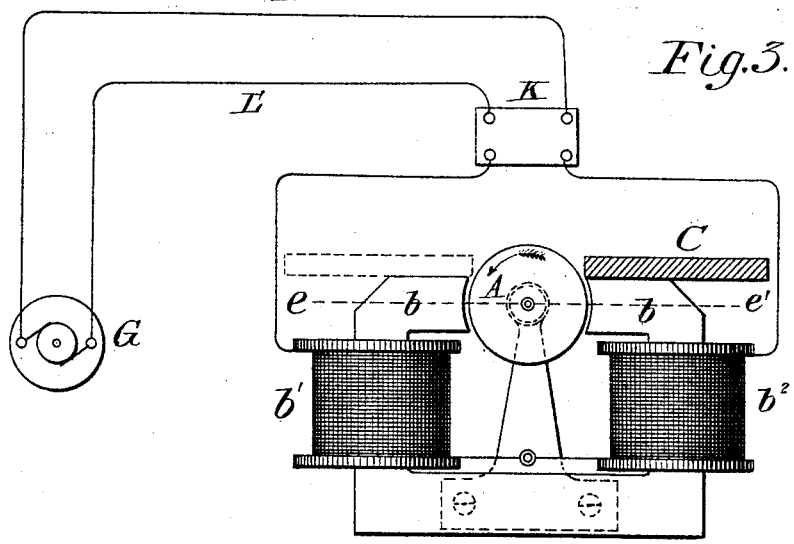
Witnesses:
W. S. Weible.
Hubert C. Steward
Inventor:
Oliver B. Shallenberger
By Terry and MacKaye
Attorneys

UNITED STATES PATENT OFFICE.

OLIVER B. SHALLENBERGER, OF ROCHESTER, PENNSYLVANIA, ASSIGNOR TO THE WESTINGHOUSE ELECTRIC AND MANUFACTURING COMPANY, OF PITTSBURG, PENNSYLVANIA.

ALTERNATING-CURRENT ELECTRIC MOTOR.

SPECIFICATION forming part of Letters Patent No. 591,242, dated October 5, 1897.

Application filed June 7, 1888. Serial No. 276,333. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Alternating-Current Electric Motors, (Case No. 210,) of which the following is a specification.

The invention relates to the conversion of electrical energy of alternating currents into mechanical energy; and it consists in a new method and a new organization of apparatus.

In systems of distribution of electrical energy it has been found desirable for economy and convenience to operate various different classes of electric translating devices from the same source of power. Thus in systems of distribution by means of direct or continuous currents it is customary to furnish both light and power to the consumers from the same supply-conductors. This is found to be entirely practicable, as there are numerous forms of efficient direct-current motors which may be introduced into electric-lighting circuits without necessitating any change in the organization of the plants.

The distribution of electric energy by alternating currents has now become well developed and has been introduced in extensive use for lighting purposes. No alternating-current electric motor has yet been brought into public use, and the result is that no alternating-current central station or plant has been able to supply power to consumers from its alternating-current machinery, nor is it possible to use the conductors installed for such current for the distribution of both power and light. The only part of the installation which can be utilized for both purposes is the steam plant and that only by a large expenditure of money in the installation of an independent system of circuits and direct-current generators.

The object of this invention is to provide an alternating-current motor which will be efficient in its operation, adapted to the various requirements of direct-current motors, and which may be applied to the numerous alternating-current plants now in general operation throughout the country without requiring any change in the generators or circuits supplied thereby.

In a direct-current motor the mutual attraction between the armature and field is obtained by maintaining two magnetic fields in such relation that the lines of polarization intersect each other at a given angle, this fixed relation being secured by the use of a commutator which directs the current in such a manner as to produce a progressive shifting of the poles with respect to the body of the armature, while at the same time the direction of the line of polarization remains fixed with reference to that of the other element. The continuous attraction or tendency to parallelism of these two lines of polarization produces rotation in the movable element of the motor, and it is the purpose of the present invention to secure in an alternating-current motor the same fixed relation of the poles by maintaining the line of polarization in one element, say the movable element, by induction from an alternating current, this line being coincident with the line of polarization of the inducing-circuit and at the same time maintaining the line of polarization in the second or stationary element at an angle to the first line by induction from the same inducing-circuit.

We have referred to the operation of the motor as due to the attraction exerted between the two elements, but it is well known that a repulsive effect also exists and that the rotation is due to the combined effects of these two forces. For convenience, however, we will take into consideration only the former as being the more important, the latter tending to augment it.

The principal elements employed in carrying out the invention are, first, an armature of metal capable of rotation; second, an electric circuit traversed by alternating electric currents and so arranged as to induce a field of force having a given polar line or axis with reference to the armature, and, third, a circuit independent of the source and so situated relatively to the first circuit that currents are produced in such second circuit by induction. The phases of these currents succeed those of the currents in the first circuit and set up for the armature a second field of force the axis of which intersects that of the first. If desired, either or both conductors may be provided with a soft-iron core. The armature may be built of soft iron, or of copper or other non-magnetic metal, or it may be composed of a core of soft iron having a conducting-circuit or other material surrounding or applied to it. These well-known modifications of construction will be well understood by the skilful constructor.

In the accompanying drawings, Figure 1 is a diagram illustrating one organization of apparatus for carrying out the invention, Fig. 2 being a cross-section of the same. Fig. 3 illustrates a modification.

The figures, while they do not show all the different varieties of motors which I have devised for carrying out the invention, will serve to illustrate the fundamental features.

Referring to Figs. 1 and 2, A represents a circular armature of metal, which may be of soft iron, or it may be of copper or other electric conducting material. It is here shown as mounted upon a shaft $a$ and placed within a coil B of insulated electric conducting-wire. The coil is shown as formed in two sections $b'\,b^2$ for convenience of construction, the shaft $a$ passing between the two. Alternating electric currents traversing this coil from a suitable source G tend to establish a field of force whose polar line or axis is approximately in the direction $e\,e'$. A second conductor C is placed in inductive relation to the conductor B and armature A. This conductor is shown in Figs. 1 and 2 as closed upon itself. It is placed with its magnetic axis at an inclination to that of the coil B. Alternating electric currents traversing the conductor C establish a field of force for the armature whose polar line or magnetic axis is approximately in the direction $f\,f'$—that is to say, inclined with reference to the polar line of the coil B. It is found in practice that when the coil B is traversed by alternating electric currents the armature will revolve in the direction indicated by the arrow $x$.

If the relative positions of the conductors B and C be changed, so that the polar line $f\,f'$ is inclined to the polar line $e\,e'$ in the opposite direction, the direction of rotation will be reversed. The conductors B and C may be made movable with reference to each other for this purpose. If the polar lines in this particular arrangement be caused to stand at right angles or parallel to each other, the rotation ceases. Between these extremes different rates of speed may be obtained. It is evident that the conductor B may be placed within the conductor C, as shown in Figs. 1 and 2, if desired, or the two conductors may be removed from each other, as illustrated, for example, in Fig. 3. In this instance the coils B are provided with a core $b$, of soft iron, although this may be dispensed with. The conductor C in this instance consists of a plate of copper or other good electric conducting material. Its position must be such that the lines of force traversing it pass through the armature in such direction as to intersect the primary polar line $e\,e'$. The direction of rotation will be in the direction indicated by the arrow $x$. Currents are induced in the plate C, which circulate in such direction as to tend to establish a line of polarization oblique to the line $e\,e'$. This line traverses the armature, and to a greater or less extent returns through the core $b$, but the resultant direction in so far as the armature is concerned is such that the two lines of polarization are established for the armature at an angle to each other. If the plate C be moved to the position indicated by the dotted lines, the direction of rotation will be reversed. The current supplied to the motor may either be derived directly from the generator G through the lines L L' or from the secondary coil of a converter K, interposed to reduce the potential.

The great advantage of my invention, in addition to the fact that it is a successful alternating-current motor, is that it enables an ordinary alternating-current lighting plant to be used for power purposes without change in or addition to the generating apparatus and distributing-conductors. This practically doubles the utility of such a plant, because without any additional expense except for fuel and wear and tear it can be operated during the day for power and during the night for lighting. Moreover, as the motors and lamps do not interfere with each other, the plant may be run for both purposes at the same time, the current being conveyed to both motors and lamps by the same main conductors. This increased utility of the plant is attended with increased earning power, which renders the investment more profitable and the electrical energy cheaper to the consumer. It is a fact that such an extension of utility will convert plants which are now unprofitable into profitable ones and will enable electric lighting to be introduced into many places not otherwise capable of supporting a plant.

Now it is evident that many other forms of armatures and many other ways of disposing the conductors and of assembling the parts may be adopted, and it is not here necessary to describe them, because the foregoing description will afford such a full, clear, and complete disclosure of the invention as to enable others skilled in the art to practice it.

I claim as my invention—

1. The method of converting electrical energy of alternating currents into mechanical energy which consists in establishing by such alternating currents a system of lines of force, causing a portion of such lines of force to produce secondary alternating currents, establishing a second system of lines of force the general axial line of which is at an angle with reference to that of the first-named system the time of the phases of such second system being determined by the resultant of the lines of force inducing the secondary currents and the lines of force due to such secondary currents, and causing the two systems of lines of force to act upon a movable element.

2. The method of converting electrical energy of alternating currents into mechanical energy in an electric motor, which consists in establishing by such currents a system of alternating lines of force, causing a portion of such lines of force to directly induce secondary alternating currents, the direction of whose path is at an angle to the first-named currents, establishing by such secondary currents lines of force at an angle with reference to the polar line of the first-named currents, and causing the movable element of the motor to move under the influence of the resultant effects of the two systems of lines of polarization thus produced.

3. The combination of a rotating armature, an inducing-circuit establishing when traversed by alternating electric currents, lines of magnetic force which polarize said armature, a second circuit having its polar line at an angle with reference to that of the inducing-circuit and in which currents are induced from the first-named circuit, having phases subsequent to the phases of the currents in the first circuit and means for establishing lines of magnetic force by the currents in the second circuit tending to polarize the armature in a different direction.

4. The combination with a coil or conductor to be traversed by alternating currents, of a stationary closed-circuit conductor, located in the field of said coil but at an angle with reference to the first-named coil whereby the alternations of a portion of the field of force shall be displaced in phase from the alternations of another or adjoining portion of the field.

5. The combination of a coil or conductor to be traversed by alternating currents and a displaced closed-circuit conductor in inductive relation thereto whereby the alternations of a portion of the field of force of said coil and closed-circuit conductor shall be displaced in phase from the alternations of another or adjoining portion and an armature in the resultant field thus produced.

6. The combination of a coil for receiving alternating currents, a closed-circuit conductor in which alternating impulses are directly induced by alternations in said coil and a continuously-rotating armature exposed to alternating inductive actions, which are the resultant of the action of the alternations in said coil and in the said closed-circuit conductor.

7. The combination with an alternating-current coil or conductor, of a stationary closed-circuit conductor, having their axial lines non-coincident but intersecting and influencing the same field whereby the field may have adjoining portions in which the phases of alternation are displaced, as and for the purpose described.

8. The combination of a coil or conductor for alternating electric currents, a closed-circuit conductor at an angle but in inductive relation thereto, and an armature placed within the inductive field of both the coil and conductor.

9. The combination with a coil or conductor for alternating electric currents, and a closed-circuit conductor in inductive relation thereto, of an armature placed within the inductive field of both the coil and conductor, and means for reversing the armature by changing the relations of the closed-circuit conductor and the armature.

10. The combination of a rotary armature, an inducing-circuit, and closed secondary circuit at an angle therewith but in inductive relation to the inducing-circuit and to the armature, the said circuits having lines of polarization which intersect each other, substantially as described.

11. The combination of a rotating armature, an inducing-conductor, establishing, when traversed by alternating electric currents, lines of magnetic force which polarize said armature, and a secondary conductor closed upon itself and receiving currents from the first-named conductor by induction and presenting lines of magnetic force tending to polarize the armature in a different direction.

12. In combination, a rotating metallic disk, a coil in proximity thereto for inducing a polar line therein, and a second coil also in proximity to said disk so arranged as to have currents directly induced therein which currents induce a second polar line at an angle with the polar line induced by the first coil.

13. In combination, a rotating metallic armature, a coil in proximity thereto for inducing a polar line therein, and a second coil also in proximity to said armature so arranged as to have currents directly induced therein which currents induce a second polar line at an angle with the polar line induced by the first coil.

In testimony whereof I have hereunto subscribed my name this 28th day of May, A. D. 1888.

OLIVER B. SHALLENBERGER.

Witnesses:
C. C. WOLFE,
CHARLES A. TERRY.